United States Patent
Tian

(10) Patent No.: US 9,612,374 B2
(45) Date of Patent: Apr. 4, 2017

(54) COLOR FILTER, DISPLAY PANEL AND DISPLAY DEVICE

(71) Applicant: BOE TECHNOLOGY GROUP CO., LTD., Beijing (CN)

(72) Inventor: Xiaoxiong Tian, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 93 days.

(21) Appl. No.: 14/548,961

(22) Filed: Nov. 20, 2014

(65) Prior Publication Data

US 2015/0362644 A1   Dec. 17, 2015

(30) Foreign Application Priority Data

Jun. 13, 2014   (CN) .......................... 2014 1 0266063

(51) Int. Cl.
*G02B 5/08* (2006.01)
*G02B 5/20* (2006.01)

(52) U.S. Cl.
CPC ........... *G02B 5/201* (2013.01); *G02B 5/0808* (2013.01)

(58) Field of Classification Search
CPC ........ G02B 5/201; G02B 5/0808; G02B 5/10; G02B 5/20; G02B 5/223; G02B 1/00; G02B 1/105; G02B 1/14; G02B 26/008; G02B 7/006; G02B 27/02; G02B 27/026; G02F 1/133504; G02F 1/133509; G02F 1/133512; G02F 1/133514; G02F 1/133516; G02F 1/133555; G02F 1/136209; G02F 2001/133519; G02F 2001/133557; G02F 2203/09; G03F 7/0007; H01L 27/14621

USPC .. 359/891–892, 885, 900, 491.01, 242, 838, 359/846; 349/64, 104, 106–110, 114, 349/156, 158, 187; 430/7; 353/84; 345/87; 428/1.1

See application file for complete search history.

(56) References Cited

U.S. PATENT DOCUMENTS

2011/0141413 A1* 6/2011 Sakai .................... G02B 5/003
                                                  349/110
2014/0367711 A1* 12/2014 Bibl ........................ H01L 24/24
                                                  257/89

FOREIGN PATENT DOCUMENTS

| CN | 1683967 A | 10/2005 |
|---|---|---|
| CN | 101520568 A | 9/2009 |
| CN | 102023435 A | 4/2011 |
| CN | 202008538 U | * 10/2011 |
| JP | 2004045782 A | 2/2004 |

OTHER PUBLICATIONS

Office Action dated Apr. 5, 2016 issued in corresponding Chinese Application No. 201410266063.1.

* cited by examiner

*Primary Examiner* — Scott J Sugarman
*Assistant Examiner* — Ibrahima Diedhiou
(74) *Attorney, Agent, or Firm* — Nath, Goldberg & Meyer; Joshua B. Goldberg

(57) ABSTRACT

The present invention provides a color filter, a display panel and a display device. The color filter comprises a substrate, on which a plurality of pixel regions are formed, in each of the plurality of pixel regions, a color film and a black matrix is provided, and a reflecting layer for reflecting ambient light entering into the color film is provided on a surface of the black matrix. Compared to the prior art, the present invention can improve the utilization rate of ambient light and improve the display effect.

19 Claims, 1 Drawing Sheet

… (1)

COLOR FILTER, DISPLAY PANEL AND DISPLAY DEVICE

FIELD OF THE INVENTION

The present invention relates to the field of display technology, and particularly relates to a color filter, a display panel and a display device.

BACKGROUND OF THE INVENTION

Currently, liquid crystal display (LCD) has become the mainstream of display products in the market due to its excellent performance and mature technology. A display panel of the liquid crystal display comprises a color filter and an array substrate, the color filter comprises color films 2 of different colors and black matrices 3 on a substrate 1 (as shown in FIG. 1), and the color films 2 of different colors can filter light to generate different colors of light, thus performing display.

LCDs, based on display modes thereof, may be categorized into transmissive LCDs, reflective LCDs and transflective LCDs. Specifically, a transmissive LCD uses a backlight as light source, light emitted from the backlight irradiates onto the color filter directly, and therefore, the transmissive LCD is of good contrast, high brightness and high color purity, but is of poor visibility and high power consumption under bright ambient light. A reflective LCD uses ambient light as light source, ambient light is reflected onto the color filter by a reflecting surface, and therefore, the reflective LCD is energy saving, of low power consumption and good visibility under bright ambient light, but is of low contrast, low color saturation, and poor visibility under weak ambient light such as night or glimmer. For a transflective LCD, each pixel unit is divided into a transmission region in which a backlight is used as light source and a reflection region in which ambient light is used as light source, and therefore, the transflective LCD is of good visibility under both bright ambient light and weak ambient light. But when using ambient light, a reflecting surface is only provided partially in each pixel unit, as a result, utilization rate of ambient light is relatively low and display effect needs to be improved.

SUMMARY OF THE INVENTION

An object of the present invention is to provide a color filter and a display panel comprising the color filter and a display device, so as to improve the utilization rate of ambient light and improve display effect of the display device.

To achieve the above object, as an aspect of the present invention, there is provided a color filter comprising a substrate, on which a plurality of pixel regions are formed, in each of the plurality of pixel regions, a color film and a black matrix is provided, and a reflecting layer for reflecting ambient light entering into the color film is provided on a surface of the black matrix.

Preferably, the black matrix comprises a top surface, a bottom surface and a side surface connecting the top surface and the bottom surface, the bottom surface of the black matrix is provided on the substrate, the top surface of the black matrix has a smaller area than the bottom surface of the black matrix, and the reflecting layer is provided on the top surface of the black matrix and/or the side surface of the black matrix.

Preferably, the side surface of the black matrix is a concave arc surface, a central angle of which is no larger than 90 degrees, and the reflecting layer is provided on the arc surface.

Preferably, the side surface of the black matrix is a flat surface, an included angle between the side surface and the bottom surface of the black matrix is equal to or larger than 45 degrees but smaller than 90 degrees, and the reflecting layer is provided on the side surface of the black matrix.

Preferably, the side surface of the black matrix comprises a connecting surface and a reflecting surface adjoining with each other, the connecting surface is connected to and perpendicular to the top surface of the black matrix, the reflecting surface and the bottom surface of the black matrix are connected and form an included angle equal to or larger than 45 degrees but smaller than 90 degrees therebetween, and the reflecting layer is provided on the reflecting surface.

Preferably, the reflecting layer is made of a metal material.

Preferably, the metal material is any one or an alloy of aluminum and silver.

As another aspect of the present invention, there is provided a display panel comprising an array substrate and a color filter, wherein, the color filter is any one of the above color filters provided by the present invention.

Preferably, a reflection structure and a transmission structure are provided on each pixel region of the array substrate, a region corresponding to the reflection structure forms a reflection region of the pixel region of the display panel, and a region corresponding to the transmission structure forms a transmission region of the pixel region of the display panel.

Preferably, the display panel further comprises a protection layer provided on the color filter, and the color films and the black matrices are arranged between the protection layer and the substrate.

As still another aspect of the present invention, there is provided a display device comprising any one of the above display panels.

It can be seen that, in a condition that a display using the color filter works in a reflection mode, when ambient light from outside enters into the color film, a part of light, after reflected by the reflection structure corresponding to the reflection region, may pass through the color film to be emitted out of the display panel, and the other light blocked by the black matrix, after reflected by the reflecting layer, may also pass through the color film and be emitted out of the display panel. Compared to the prior art, with the color filter provided by the present invention, the amount of light passing through the color film can be increased, thus improving the utilization rate of ambient light and the display effect of the display device.

BRIEF DESCRIPTION OF THE DRAWINGS

The accompanying drawings are used for providing further understanding of the present invention, constitute a part of the specification, and are used for explaining the present invention together with the following specific implementations, rather than limiting the present invention, in which.

DETAILED DESCRIPTION OF THE EMBODIMENTS

The specific implementations of the present invention are described below in detail in conjunction with the accompanying drawings. It should be understood that the specific implementations described herein are merely used for describing and explaining the present invention, but not for limiting the present invention.

Figure 1:
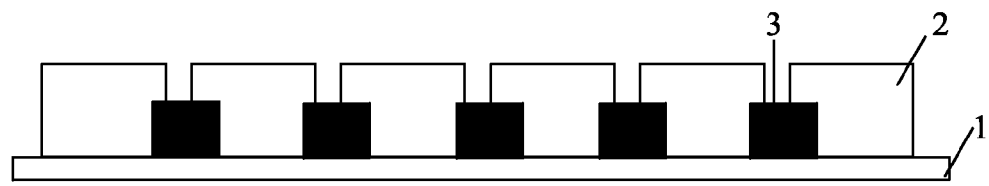
FIG. 1 is a schematic diagram of a structure of a color filter in the prior art.
Figure 2:
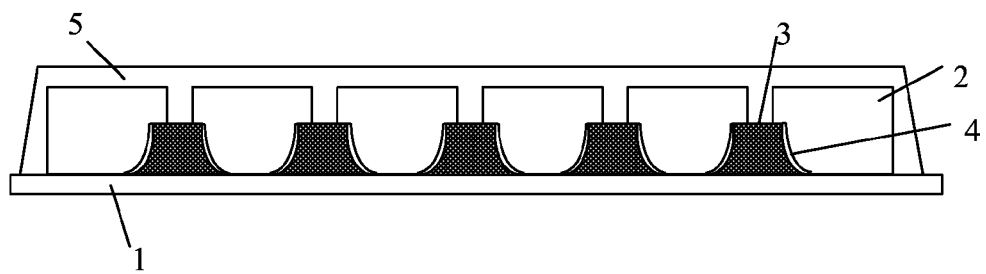
FIG. 2 is a schematic diagram of a structure of a color filter in a first implementation of the present invention.
Figure 3:
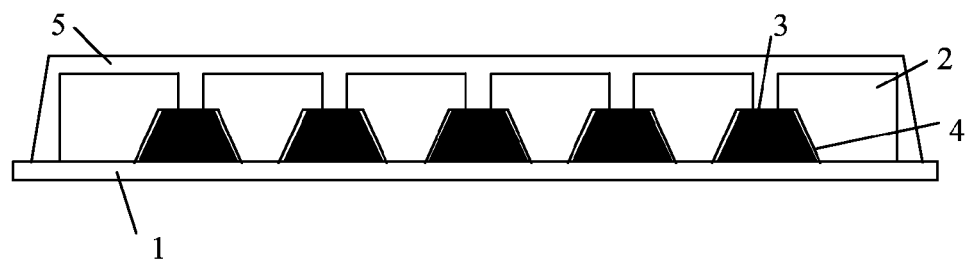
FIG. 3 is a schematic diagram of a structure of a color filter in a second implementation of the present invention.
Figure 4:
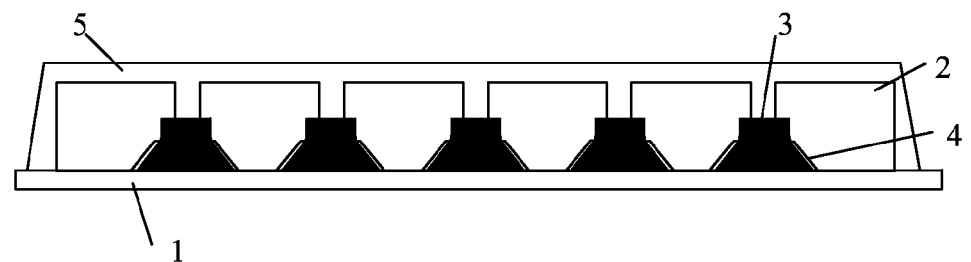
FIG. 4 is a schematic diagram of a structure of a color filter in a third implementation of the present invention.

As an aspect of the present invention, a color filter is provided, as shown in FIGS. 2 to 4, the color filter comprises a substrate 1, on which a plurality of pixel regions are formed, in each of the plurality of pixel regions, a color film 2 and a black matrix 3 is provided, and a reflecting layer 4 for reflecting ambient light entering into the color film 2 is provided on a surface of the black matrix 3.

The color filter provided by the present invention particularly applies to a transflective display, in which, each pixel region may be divided into a reflection region and a transmission region, and accordingly, a reflection structure corresponding to the reflection region and a transmission structure corresponding to the transmission region are provided in the pixel region of the display panel of the display. When ambient light from outside is relatively bright, the display works in a reflection mode, and ambient light, after passing through the color film 2 and entering into the display panel, is reflected by the reflection structure and then passes through the color film 2 to be emitted out of the display panel; when ambient light from outside is relatively weak, the display works in a transmission mode, and light emitted from a backlight of the display, after transmitted through the transmission structure, passes through the color film 2 to be emitted out of the display panel. In the present invention, the reflecting layer 4 is provided on the surface of the black matrix 3, when ambient light from outside enters into the color film 2, a part of light, after reflected by the reflecting structure, may passes through the color film 2 to be emitted out of the display panel, and a part of light blocked by the black matrix 3, after reflected by the reflection layer 4, may also pass through the color film 2 to be emitted out. Compared to the prior art, the amount of light passing through the color film 2 can be increased, thus improving the utilization rate of ambient light and the display quality.

Of course, the color filter provided by the present invention may also apply to a display of other type that can work in a reflection mode, such as a reflective LCD.

To enable the reflecting layer 4 to reflect towards the color film 2 ambient light emitted to the black matrix 3 to a larger extent, further, the black matrix 3 comprises a top surface, a bottom surface, and a side surface connecting the top surface and the bottom surface, the bottom surface of the black matrix 3 is provided on the substrate 1, the top surface of the black matrix 3 has a smaller area than the bottom surface of the black matrix 3, and the reflecting layer 4 is provided on the top surface of the black matrix 3 and/or the side surface of the black matrix 3, thus light passing through the color film 2 and emitted to the reflecting layer 4 can be easily emitted out of the display panel after passing through the color film 2 again.

It should be understood that, the bottom surface of the black matrix 3 is a surface of the black matrix 3 contacting a surface of the substrate 1, the top surface of the black matrix 3 is a surface opposite to the bottom surface, that is, a surface away from the substrate 1. Further, the black matrix 3 in the present invention may be formed by changing the shape of an existing black matrix 3 in the prior art, specifically, the bottom surface of the black matrix 3 remains unchanged, and the area of the top surface of the black matrix 3 is decreased so as to prevent the pixel aperture ratio from being affected.

It should be noted that, the reflecting layer 4 may be provided on the top surface of the black matrix 3, or be provided on the side surface of the black matrix 3, or be provided on both the top surface and the side surface of the black matrix 3, which may be determined according to actual application. For example, in a condition that the display is mostly used under relatively weak ambient light, the reflecting layer 4 may be provided on both the top surface and the side surface of the black matrix 3, so as to improve display brightness; in a condition that the display is mostly used under relatively bright ambient light, the reflecting layer 4 may be only provided on the side surface of the black matrix 3, so that the display brightness is improved while the contrast is prevented from being affected.

The shape of the black matrix 3 is not limited in the present invention, as long as the reflecting layer 4 provided on the black matrix 3 can reflect light towards the color film 2.

As a first specific implementation of the present invention, as shown in FIG. 2, the side surface of the black matrix 3 is a concave arc surface, a central angle of which is no larger than 90 degrees, and the reflecting layer 4 is provided on the arc surface. The benefit achieved by providing the reflecting layer 4 on the arc surface is in that, the arc-shaped reflecting layer 4 can not only reflect ambient light to the color film 2, but also converge the reflected light to further improve display brightness.

As a second specific implementation of the present invention, as shown in FIG. 3, the side surface of the black matrix 3 is a flat surface, and an included angle between the side surface of the black matrix 3 and the bottom surface of the black matrix 3 is equal to or larger than 45 degrees but smaller than 90 degrees, and the reflecting layer 4 is provided on the side surface of the black matrix 3. The included angle between the side surface and the bottom surface of the black matrix 3 may be determined according to actual application, when ambient light is relatively weak, the included angle between the side surface and the bottom surface of the black matrix 3 may be set to be relatively small, so as to increase reflection area; on the contrary, when ambient light is relatively bright, the included angle between the side surface and the bottom surface of the black matrix 3 may be set to be relatively large. Compared to the first specific implementation, with the side surface of the black matrix 3 being a flat surface, the reflecting layer 4 may be set more easily.

As a third specific implementation of the present invention, as shown in FIG. 4, the side surface of the black matrix 3 comprises a connecting surface and a reflecting surface adjoining with each other, the connecting surface is connected and perpendicular to the top surface of the black matrix 3, the reflecting surface and the bottom surface of the black matrix 3 are connected and form an included angel equal to or larger than 45 degrees but smaller than 90 degrees therebetween, and the reflecting layer 4 is provided on the reflecting surface. It should be noted that, the "perpendicular to" does not refer to an angle of exactly 90 degrees, but refer to an angle in a certain range, for example, the angle between the connecting surface and the top surface may be in the range of 90±5 degrees. It can be understood that, in a condition that the bottom surface of the black matrix 3 has a fixed size, when the top surface of the black matrix 3 in the second specific implementation and the top surface of the black matrix 3 in the third specific implementation are of the same size, the included angle between the reflecting layer 4 and the bottom surface in the second specific implementation is relatively large, and the included angle between the reflecting layer 4 and the bottom surface in the third specific implementation is relatively small; when the included angle between the reflecting layer 4 and the bottom surface in the second specific implantation and the included angle between the reflecting layer 4 and the bottom surface in the third specific implementation are the same, the top surface of the black matrix 3 in the second specific implementation is relatively small, and the top surface of the black matrix 3 in the third specific implementation is relatively large, and therefore, the setting of the black matrix 3 in the third specific implementation is more stable.

Further, the reflecting layer 4 is made of a metal material, such as aluminum, silver or the like, to improve reflection effect.

The implementations of the color filter provided by the present invention have been described as above, it can be seen that, in a condition that a display using the color filter works in a reflection mode, when ambient light from outside enters into the color film 2, a part of light, after reflected by the reflection structure corresponding to the reflection region, may pass through the color film 2 to be emitted out of the display panel, and the other light blocked by the black matrix 3, after reflected by the reflecting layer 4, may also pass through the color film 2 and be emitted out of the display panel. Compared to the prior art, with the color filter provided by the present invention, the amount of light passing through the color film 2 can be increased, thus improving the utilization rate of ambient light and further improving the display quality.

As another aspect of the present invention, there is provided a display panel comprising an array substrate and a color filter, and the color filter is any one of the above color filters provided by the present invention.

Further, a reflection structure and a transmission structure are provided on each pixel region of the array substrate, a region corresponding to the reflection structure forms a reflection region of the pixel region of the display panel, and a region corresponding to the transmission structure forms a transmission region of the pixel region of the display panel.

Still further, as shown in FIGS. 2 to 4, the display panel further comprises a protection layer 5 provided on the color filter, and the color films 2 and the black matrices 3 are arranged between the protection layer 5 and the substrate 1.

As still another aspect of the present invention, there is provided a display device comprising any one of the above display panels. The display device may be any product or component with a display function, such as a liquid crystal panel, an electronic paper, an OLED panel, a mobile phone, a tablet computer, a television, a display, a notebook computer, a digital camera frame, a navigator, or the like, thus, in a reflection mode, the utilization rate of ambient light and the display effect of the display device are improved.

It can be understood that the above implementations are merely exemplary implementations used for explaining the principle of the present invention, but the present invention is not limited thereto. For those skilled in the art, various modifications and improvements may be made without departing from the spirit and essence of the present invention, and these modifications and improvements may also be considered to be within the protection scope of the present invention.

The invention claimed is:

1. A color filter, comprising a substrate, on which a plurality of pixel regions are formed, in each of the plurality of pixel regions, a color film and a black matrix is provided, wherein, a reflecting layer for reflecting ambient light entering into the color film is provided on a surface of the black matrix, wherein the black matrix comprises a top surface, a bottom surface and a side surface connecting the top surface and the bottom surface, the bottom surface of the black matrix is provided on the substrate, the top surface of the black matrix has a smaller area than the bottom surface of the black matrix, and the reflecting layer is provided on the top surface of the black matrix and/or the side surface of the black matrix; and the side surface of the black matrix is a concave arc surface, a central angle of which is no larger than 90 degrees, and the reflecting layer is provided on the arc surface.

2. A color filter comprising a substrate, on which a plurality of pixel regions are formed, in each of the plurality of pixel regions, a color film and a black matrix is provided, wherein, a reflecting layer for reflecting ambient light entering into the color film is provided on a surface of the black matrix, wherein the black matrix comprises a top surface, a bottom surface and a side surface connecting the top surface and the bottom surface, the bottom surface of the black matrix is provided on the substrate, the top surface of the black matrix has a smaller area than the bottom surface of the black matrix, and the reflecting layer is provided on the top surface of the black matrix and/or the side surface of the black matrix; and the side surface of the black matrix is a flat surface, and an included angle between the side surface and the bottom surface of the black matrix is equal to or larger than 45 degrees but smaller than 90 degrees, and the reflecting layer is provided on the side surface of the black matrix.

3. The color filter of claim 1, wherein, the reflecting layer is made of a metal material.

4. The color filter of claim 3, wherein, the metal material is any one or an alloy of aluminum and silver.

5. The color filter of claim 2, wherein, the reflecting layer is made of a metal material.

6. The color filter of claim 5, wherein, the metal material is any one or an alloy of aluminum and silver.

7. A display panel, comprising an array substrate and the color filter of claim 1.

8. A display panel comprising an array substrate and the color filter of claim 4.

9. The display panel of claim 7, wherein, the reflecting layer is made of a metal material.

10. The display panel of claim 9, wherein, the metal material is any one or an alloy of aluminum and silver.

11. The display panel of claim 8, wherein, the reflecting layer is made of a metal material.

12. The display panel of claim 11, wherein, the metal material is any one or an alloy of aluminum and silver.

13. The display panel of claim 7, wherein, a reflection structure and a transmission structure are provided on each pixel region of the array substrate, a region corresponding to the reflection structure forms a reflection region of the pixel region of the display panel, and a region corresponding to the transmission structure forms a transmission region of the pixel region of the display panel.

14. The display panel of claim 9, wherein, a reflection structure and a transmission structure are provided on each pixel region of the array substrate, a region corresponding to the reflection structure forms a reflection region of the pixel region of the display panel, and a region corresponding to the transmission structure forms a transmission region of the pixel region of the display panel.

15. The display panel of claim 10, wherein, a reflection structure and a transmission structure are provided on each pixel region of the array substrate, a region corresponding to the reflection structure forms a reflection region of the pixel region of the display panel, and a region corresponding to the transmission structure forms a transmission region of the pixel region of the display panel.

16. The display panel of claim 8, wherein, a reflection structure and a transmission structure are provided on each pixel region of the array substrate, a region corresponding to the reflection structure forms a reflection region of the pixel region of the display panel, and a region corresponding to the transmission structure forms a transmission region of the pixel region of the display panel.

17. The display panel of claim 7, wherein, the display panel further comprises a protection layer provided on the color filter, and the color films and the black matrices are arranged between the protection layer and the substrate.

18. A display device, comprising the display panel of claim 7.

19. A display device, comprising the display panel of claim 8.

* * * * *